March 12, 1963 E. W. HINES ET AL 3,081,139

ADJUSTABLE ELECTRONIC CHASSIS MOUNTING

Filed Aug. 2, 1960 2 Sheets-Sheet 1

INVENTORS
EUGENE W. HINES
ROBERT A. HARD

BY F. J. Soucek
ATTORNEY

March 12, 1963 E. W. HINES ET AL 3,081,139

ADJUSTABLE ELECTRONIC CHASSIS MOUNTING

Filed Aug. 2, 1960 2 Sheets-Sheet 2

INVENTORS
EUGENE W. HINES
ROBERT A. HARD

BY F. J. Soucek

ATTORNEY

United States Patent Office 3,081,139

Patented Mar. 12, 1963

3,081,139
ADJUSTABLE ELECTRONIC CHASSIS MOUNTING

Eugene William Hines, Davison, and Robert A. Hard, Fenton, Mich., assignors to General Motors Corporation, Detroit Mich., a corporation of Delaware

Filed Aug. 2, 1960, Ser. No. 46,948
4 Claims. (Cl. 312—351)

This invention relates generally to a support for electronic chassis, and more particularly to an adjustable mounting means for mounting a number of electronic chassis within a cabinet.

It has been found that a great amount of difficulty has been encountered in providing a cabinet structure for supporting a plurality of electronic chassis within a cabinet. The prior methods of manufacturing electronic cabinets require precision layout work and detailed machining to assure proper alignment of the chassis within the cabinet. If the close tolerances are not maintained it is difficult to properly align the chassis within the cabinet and it is found that due to the precision required in maintaining these machining tolerances it is necessary to use precision machining operations. This requires a number of working hours for skilled machinists. For this reason the cabinets produced by prior methods are quite expensive.

Since the cabinets made by the prior methods require a large amount of precision work, it is difficult to produce the cabinets in advance without the exact dimensional requirements being known. Also, it is necessary to provide particular cabinets for each installation since the cabinets are not adapted to be used in a variety of installations; therefore, it is necessary to maintain a large inventory of electronic cabinets.

Our invention eliminates the abovementioned difficulties found in the prior method of manufacturing electronic cabinets by providing within the cabinet structure an adjustable chassis mounting arrangement that allows the chassis to be mounted in the cabinet in a variety of positions. By using our invention, the cabinet may be produced by conventional manufacturing methods and the necessity for maintaining rigid dimensional tolerances is not necessary.

Figure 1:
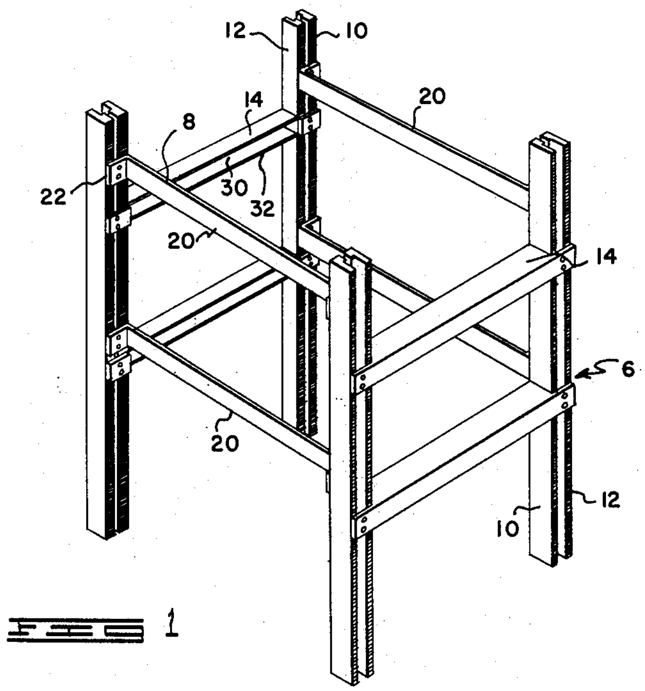
FIGURE 1 is a perspective view of the chassis mounting.
Figure 7:
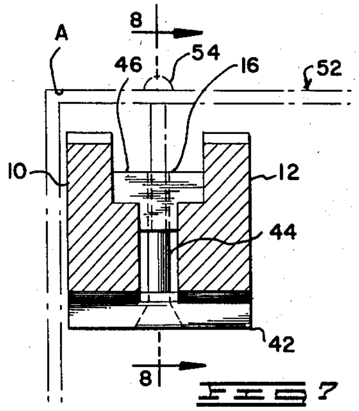
FIGURE 7 is an enlarged sectional view showing the captive bolt assembly.

Referring now to FIGURE 1, to support the chassis (not shown) the upright supports 6 are positioned within the cabinet structure A shown in phantom lines in FIGURE 7, and the tracks 20 are affixed on the supports 6 to extend in a longitudinal direction. The chassis is slidably supported by the tracks 20. To restrain longitudinal movement of the chassis cross bars 14 are provided at the front and rear of the cabinet. These cross bars are secured to the upright supports 6 in a manner to be described below.

Figure 2:
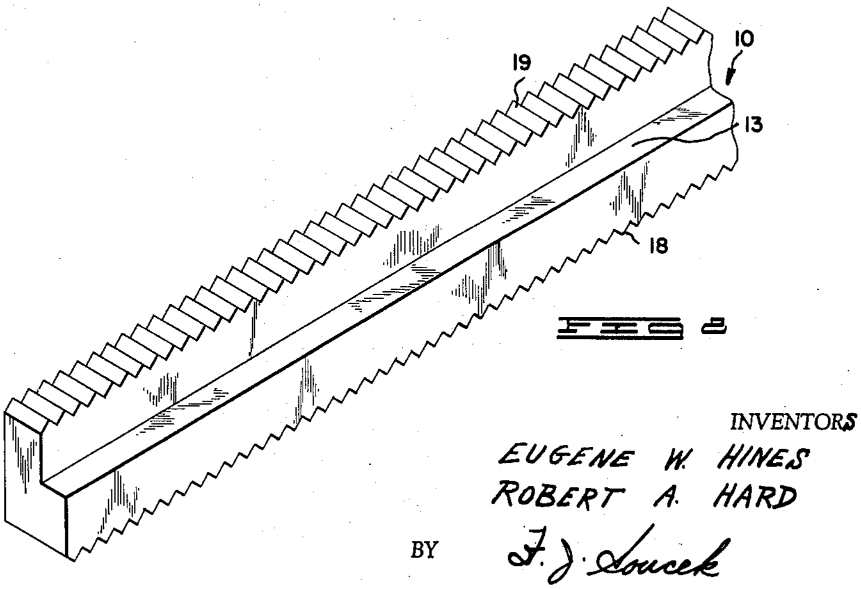
FIGURE 2 is a perspective view of the vertical support bar used in our invention.

To allow vertical adjustment of the cross bars 14 and the tracks 20, the vertical supports 6 are made of two bars 10 and 12. These bars are spaced by spacing blocks located at either end. As seen in FIGURE 2 the inner and outer surfaces of the bars have provided thereon serrated portions 18 and 19, respectively. The pitch of the serrations determines the fineness by which the tracks and cross bars may be adjusted along the supports 6. Any appropriate pitch may be used although the practical minimum is approximately .005" to .010". The bars 10 and 12 have a step 13 machined therein and are mounted together so that the thicker of the two sections is toward the internal portion of the cabinet.

Figure 3:
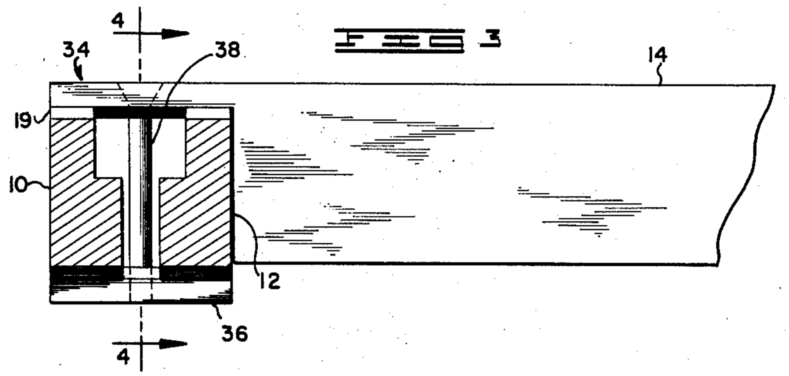
FIGURE 3 is an enlarged sectional view showing the joint between the vertical support and the front cross bar.
Figure 4:
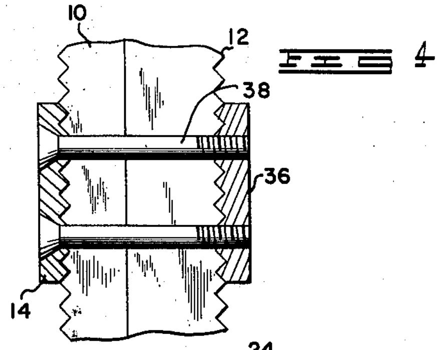
FIGURE 4 is a sectional view taken along line 4—4 of FIGURE 3.
Figure 5:
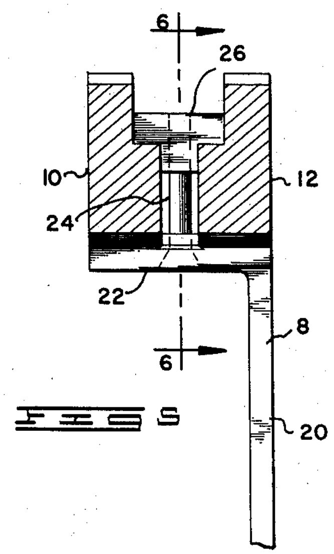
FIGURE 5 is an enlarged sectional view showing the joint between the vertical support and the track.

The cross bar 14, as shown in FIGURE 3, has a serrated end portion 34. To affix the cross bar to the bars 10 and 12 at either the front or rear of the cabinet, the serrated portion 34 engages the serrated surface 19 on the bars 10 and 12. A serrated plate 36 engages surfaces 18 of bars 10 and 12 and receives bolts 38 to clamp the cross bar into position. A cross section of the joint is shown in FIGURE 4. It is noted that the cross bar 14 may be placed in any vertical position along the bars 10 and 12 by readjusting the engagement between the cross bar and bars.

Figure 6:
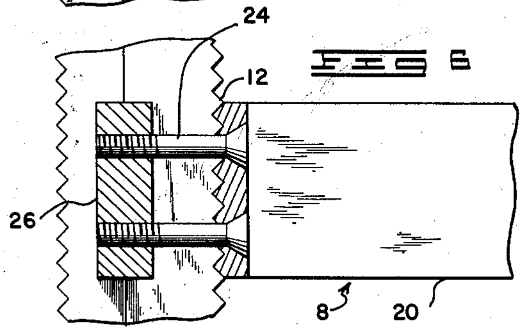
FIGURE 6 is a sectional view taken along line 6—6 of FIGURE 5.

The tracks 8 have an elongated portion 20 that extends from the front to the rear of the cabinet. At either end of the tracks a serrated portion 22 extends perpendicularly from the track 8. The portion 22 cooperates with surfaces 18 of bars 10 and 12 to mount the track within the cabinet. The T block 26 fits within the stepped portion of bars 10 and 12 to provide a means for clamping the portion 22 onto the support 6 by the bolts 24. As shown in FIGURE 6 the track 8 is adjustable in the same manner as the cross bars 14.

By positioning the tracks 8 and cross bars 14 as described in the above, a chassis may be mounted within the cabinet in a variety of vertical positions. Since the gripping surfaces between the vertical supports 6 and the cross bars 14 or tracks 8 are serrated, they provide a positive supporting arrangement. This positive supporting arrangement is superior to a purely frictional gripping means especially when the cabinet is subjected to severe vibrations.

Figure 8:
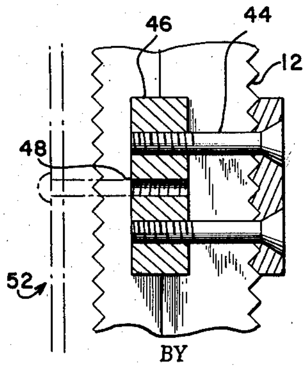
FIGURE 8 is a sectional view taken along line 8—8 of FIGURE 7.

As shown in FIGURES 7 and 8, a captive bolt assembly 16 allows the front panel 52 of the electronic chassis to be affixed to the supporting means. The assembly 16 consists of plate 42 that is serrated on one side and a T block 46 provided with a tapped hole 48. The surfaces 18 of the bars 10 and 12 coact with the knurled plate 42 to adjust the T block 46 so that the hole 48 will align with the bolt 54 used to clamp the panel 52 to the cabinet structure A. FIGURE 8 shows a cross section of the captive bolt assembly shown in FIGURE 7 and shows that it may be adjusted into any of a number of vertical positions.

Our invention provides a positive means for securing the electronic chassis in a variety of vertical positions and while various changes may be made in the details as described above they may still fall within the scope and spirit of this invention as claimed.

What is claimed is:

1. In a cabinet adapted for mounting an electronic chassis or similar equipment having a front mounting panel, a plurality of front and rear upright supports each comprising two bars having steps therein and inner and outer serrated surfaces, two longitudinally extending tracks for slidably supporting the chassis, said tracks comprising an elongated slide portion and perpendicular serrated end portions, means for securing the serrated end portions of the track respectively to the inner serrated surfaces of the appropriate front and rear upright supports to thereby positively mount the chassis in one of a number of vertical positions, a front and a rear cross bar each provided with a serrated surface at the end to engage the outer serrated surfaces of the appropriate front and rear upright supports and means for securing the front and rear cross bars to the upright supports to restrain longitudinal movement of the chassis, and adjustable bolt assemblies positively secured to the front upright supports within said bar steps to receive a fastening means extending from the front panel to thereby secure the chassis in the desired position within the cabinet.

2. In a cabinet adapted for mounting an electronic chassis or similar equipment, a plurality of front and rear upright supports each comprising two bars having steps therein and inner and outer securing surfaces, two longitudinally extending tracks for supporting the chassis, said track comprising an elongated portion and end portions adapted to be positively secured respectively to the inner securing surfaces of the appropriate front and rear upright supports to thereby mount the chassis in one of a number of vertical positions, a front and a rear cross bar each in positive engagement with the outer securing surfaces of the appropriate front and rear upright supports to restrain longitudinal movement of the chassis, and adjustable bolt assemblies positively secured to the front upright supports by engagement with said inner securing surfaces and said steps of said bars to receive an externally threaded fastening means extending from the chassis to thereby secure the chassis in the desired position within the cabinet.

3. In a cabinet adapted for mounting an electronic chassis or similar equipment, two front and two rear upright supports each comprising two bars having steps therein and inner and outer securing surfaces, two longitudinally extending tracks for supporting the chassis, said tracks comprising an elongated portion and end portions adapted to be positively secured respectively to the inner securing surfaces of the appropriate front and rear upright supports to thereby mount the chassis in one of a number of vertical positions, a front and a rear cross bar, said front cross bar extending between the two front upright supports and said rear cross bar extending between the two rear upright supports and means for securing the front and rear cross bars to the upright supports to restrain longitudinal movement of the chassis, and adjustable bolt assemblies positively secured to the front upright supports by engagement with said inner securing surfaces and said steps of said bars to receive an externally threaded fastening means extending from the chassis to thereby secure the chassis in the desired position within the cabinet.

4. In a cabinet adapted for mounting an electronic chassis or similar equipment having a front panel, two longitudinally extending tracks for slidably supporting the chassis, said tracks comprising an elongated slide portion that contacts the chassis and perpendicular serrated end portions, a front and a rear cross bar each provided with a serrated end surface at the ends, a plurality of front and rear upright supports each comprising two bars having steps therein and inner and outer serrated surfaces, means for positively securing the tracks on the inner serrated surfaces of alternate pairs of a front and a rear upright support in one of a number of vertical positions determined by the serrated surface of the upright support, means for positively securing the front cross bar to the outer serrated surfaces of adjacent pairs of front upright supports and the rear cross bar to the outer serrated surfaces of adjacent rear upright supports, said cross bar securing means allowing vertical adjustment of the cross bars, and adjustable bolt assemblies positively secured to the front upright supports within said bar steps to receive a fastening means extending from the front panel of the chassis to thereby secure the chassis in the desired position within the cabinet.

References Cited in the file of this patent

UNITED STATES PATENTS

| | | |
|---|---|---|
| 427,462 | Crider | May 6, 1890 |
| 2,329,815 | Attwood | Sept. 21, 1943 |
| 2,737,268 | Smith | Mar. 6, 1956 |
| 2,925,181 | Saul | Feb. 16, 1960 |
| 2,928,512 | Slater | Mar. 15, 1960 |